United States Patent
Kashchenevsky

(10) Patent No.: US 8,646,979 B2
(45) Date of Patent: Feb. 11, 2014

(54) HYBRID HYDRO (AIR) STATIC MULTI-RECESS JOURNAL BEARING

(75) Inventor: Leonid Kashchenevsky, New Britain, CT (US)

(73) Assignee: Elka Precision, LLC, Bristol, CT (US)

(*) Notice: Subject to any disclaimer, the term of this patent is extended or adjusted under 35 U.S.C. 154(b) by 999 days.

(21) Appl. No.: 12/230,849

(22) Filed: Sep. 5, 2008

(65) Prior Publication Data

US 2009/0074337 A1 Mar. 19, 2009

Related U.S. Application Data

(60) Provisional application No. 60/960,064, filed on Sep. 13, 2007.

(51) Int. Cl.
F16C 32/06 (2006.01)

(52) U.S. Cl.
USPC ............................................. 384/118; 384/114

(58) Field of Classification Search
USPC ......... 384/100, 111, 112, 114, 115, 118, 120, 384/291
See application file for complete search history.

(56) References Cited

U.S. PATENT DOCUMENTS

| | | | |
|---|---|---|---|
| 3,110,527 A | 11/1963 | Fox | |
| 3,132,906 A * | 5/1964 | Sternlicht | 384/114 |
| 3,351,394 A | 11/1967 | Hooker | |
| 3,385,009 A | 5/1968 | Lueders | |
| 3,387,899 A | 6/1968 | Hahn et al. | |
| 3,680,932 A | 8/1972 | Raimondi | |
| 4,371,216 A | 2/1983 | Suzuki et al. | |
| 4,490,054 A | 12/1984 | Kimmelaar | |
| 4,602,873 A * | 7/1986 | Izumi et al. | 384/99 |
| 4,747,705 A * | 5/1988 | Agrawal | 384/118 |
| 4,919,549 A | 4/1990 | Lawson et al. | |
| 5,462,364 A | 10/1995 | Chandrasekaran et al. | |
| 5,871,285 A | 2/1999 | Wasson | |
| 6,036,413 A | 3/2000 | Chandrasekar | |
| 6,469,866 B1 * | 10/2002 | Nii et al. | 360/99.08 |
| 6,547,438 B2 | 4/2003 | Shima | |
| 6,880,976 B2 | 4/2005 | Huang et al. | |
| 6,935,786 B2 | 8/2005 | Hirano et al. | |
| 2001/0048777 A1 * | 12/2001 | Brune et al. | 384/100 |
| 2005/0244086 A1 * | 11/2005 | Murata et al. | 384/91 |
| 2006/0051003 A1 * | 3/2006 | Nii et al. | 384/114 |

OTHER PUBLICATIONS

Chapter I, International Preliminary Report on Patentability, issued Mar. 16, 2010.

* cited by examiner

*Primary Examiner* — Alan B Waits
(74) *Attorney, Agent, or Firm* — Oliff PLC

(57) ABSTRACT

Multi-recess hydrostatic journal bearings support a rotating shaft and have inclined surfaces, each inclined surface forming a variable radial gap with the surface of the shaft, the variable gaps converging in the direction of rotation of the shaft to increase hydrodynamic forces, reduce a turbulent component of shear friction, and improve the thermal stability of the journal bearing. The inclined surfaces can be formed in one or more of portions of recess bottoms in recesses, portions of gap lands surrounding recesses, and portions of an inner surface of a bushing.

6 Claims, 8 Drawing Sheets

HYBRID HYDRO (AIR) STATIC MULTI-RECESS JOURNAL BEARING

INCORPORATION BY REFERENCE

This application claims the benefit of U.S. Provisional Application No. 60/960,064, "HYBRID HYDRO (AIR) STATIC MULTI-RECESS JOURNAL BEARING" filed on Sep. 13, 2007, which is incorporated herein by reference in its entirety.

BACKGROUND

Hydrostatic journal and thrust bearings supporting hydrostatic spindles are widely used in many different applications ranging from precision machine tools to turbomachinery. Hydrostatic bearings have the characteristics of ultra-high rotational accuracy, high static stiffness, extremely high resistance to vibrations, extremely high stability, and being virtually free of wear. The thermal stability of hydrostatic bearings is also very high because the circulating liquid media, e.g. oil, flow through the hydrostatic bearings from an external hydraulic power unit usually has precise temperature control. Further, the almost equal thermal expansion of the rotating shaft and the bearing housing of hydrostatic bearings keeps gaps constant even when the oil temperature changes over a wide range. Hydrostatic bearings, especially in high speed applications, have the further advantages that their lifetime is not sensitive to either unbalanced forces or electromagnetic forces between the stator and the rotor of built-in motors, a common way to run shafts at high speed; and that the thermal expansion of shafts caused by high temperatures of built-in motors is much smaller as compared to spindles with built-in motors that are mounted on contact type bearings because of the chilled oil flow circulating through the hydrostatic bearings.

DESCRIPTION OF RELATED ART

U.S. Pat. No. 3,387,899 to Hahn et al. (Hahn) discloses a prototype of a special type of hydrostatic bearing generally called a "stepped hydrostatic bearing". A common stepped hydrostatic bearing consists of two portions along the bearing axis: a first, longer portion having a larger gap, and a second, shorter portion having a smaller gap. This type of bearing does not have recesses or inlet restrictors, has a very simple design, and is simple to manufacture. However, this type of bearing has relatively low stiffness and a low damping ratio, about 5 to 8 times lower compared with the same size multi-recess bearing having inlet restrictors. This type of bearing is usually used in service operations rather than to support a spindle. For example, this bearing can be used to support valves to eliminate friction. The bearing of the Hahn patent has first portions modified from the standard, commonly used stepped bearing to have moderate slope surfaces 35 that, in operation, generate hydrodynamic forces which increase the bearing's stiffness. FIG. 4 shows a cross-section of the spindle 11 in a first portion, having the moderate slope surfaces 35 and FIG. 3 shows a cross-section of the spindle 11 in a second portion. However, the total stiffness, both hydrostatic stiffness and hydrodynamic stiffness, of this type of bearing is several times lower than the total stiffness, in operation, of variations of the bearings disclosed herein.

U.S. Pat. No. 4,371,216 to Suzuki et al. (Suzuki) discloses the addition of additional space, land portions 17 (FIG. 1), to provide, in operation, a hydrodynamic component of stiffness. In contrast to bearings disclosed herein, the Suzuki bearing does not use the same surface to generate both hydrostatic and hydrodynamic forces. At the bottom of col. 3 to the top of col. 4, Suzuki discloses that "[t]he above-described fluid pockets 15 and 16 serve as a hydrostatic pressure generating zone, while the land portion 17 serves as a hydrodynamic pressure generating zone". In other words, the Suzuki bearing essentially combines the characteristics of a hydrostatic bearing and a hydrodynamic bearing. A problem of this type of bearing is that the additional artificially created space, e.g., land portions 17, increases the heat generation of the bearing in operation. This type of bearing can not be applied to high speed use because of significantly increased friction in operation due to the significantly increased gap area inherent in this design.

U.S. Pat. No. 4,919,549 to Lawson et. al. (Lawson) discloses a typical bearing modification using additional moving parts. Bearing pads 52-54 are pivoting pads. In this type of bearing, the pivoting pads are used as hydrostatic recesses due to the additional high pressure oil supply to these pads. This type of bearing has a very high load capacity. However, this type of bearing suffers from the problem of being much more sophisticated and much more expensive to manufacture than conventional bearings, and stiffness in the central position is not high because of the flexibility of the pivoting pads. Additionally, this type of bearing suffers from the problem that the pads and an elastomeric bushing reduce rotational accuracy. Thus, this type of bearing is suitable for applications not requiring either high stiffness in the center or high rotational precision, such as in the textile industry. However, in contrast to variations of the bearings disclosed herein, this type of bearing is not suitable for applications requiring high central stiffness and high rotational precision, such as precision machining applications, because stiffness in the central position and rotational accuracy are the most critical characteristics for machine tool spindles, especially for grinding machines.

U.S. Pat. No. 5,462,364 to Chandrasekaran discloses a high speed milling spindle and bearing for mainly vertical applications. In vertical orientations, the problem of fluid leakage is extremely critical. The Chandrasekaran patent offers a solution to this problem that requires a very sophisticated and very expensive type of air sealing. FIGS. 3-5 show recesses with inclined gaps between inwardly facing surfaces 53-56 and complimentary surface 11. However, the inclined gaps are symmetrical. One portion of the gap converges in the direction of rotation and the other portion of the gap diverges in the direction of rotation. For this reason, this bearing enables bi-directional spindle rotation critical for milling applications. However, this type of bearing suffers from the problem that this design almost completely eliminates the advantages of hydrodynamic effects because, in operation, pressure will increase in the converged portion of the gap but will decrease in the diverged portion of the gap. Further, this type of bearing suffers from the problem that cavities (areas with negative pressure) can form in operation, which can be very dangerous to the spindle's stability.

U.S. Pat. No. 6,547,438 to Shima and U.S. Pat. No. 6,935,786 to Hirano et al. (Hirano) are very similar one to each other. These patents disclose technical solutions that increase the thermal stability of bearings by providing adaptive systems to optimize the thermal behavior of the spindle. In general, these bearings do little to increase the hydrodynamic component of the stiffness over conventional bearings. However, the embodiments having U-shaped recesses (Shima, FIGS. 3B, 4B and 12B; Hirano, FIGS. 1B, 5B, and 6B) increase hydrodynamic forces in operation simply because the surface of the lands is increased significantly. As with the type of bearing of Suzuki, the Shima and Hirano bearings use a solution in which the lands that generate hydrodynamic forces and the lands that generate hydrostatic forces are separated. However, in this type of bearing, the hydrodynamic forces in operation are exactly perpendicular to direction of an applied loads. In contrast, variations of the bearings disclosed herein also produce hydrodynamic forces directed opposite to applied loads as a result of the inclined surfaces used.

SUMMARY

Aspects of the invention provide multi-recess hydrostatic journal bearings that effectively combine hydrostatic and hydrodynamic forces, that are simple to manufacture, that have reduced friction power at high speeds, that have better thermal stability, and that do not contain additional moving parts.

in aspects of the invention, the multi-recess hydrostatic journal bearing can include a rotatable shaft having an outer surface, a bearing housing that surrounds the shaft, the bearing housing having an inner surface facing the outer surface of the shaft, and a plurality of recesses located in the internal surface of the bearing housing. Each recess has a corresponding recess bottom. A pressurized liquid media is between the inner surface of the bearing housing and the outer surface of the shaft, and inlet restrictors for the plurality of recesses are connected through openings in the bearing housing to a pump for an external source of the pressurized liquid media. Gap lands surround each of the plurality of recesses, the gap lands separating the recesses from chambers connected to a drain line and separating one recess from another. At least one of the recess bottoms and the gap lands is inclined to form variable gaps with the outer surface of the shaft, the variable gaps decreasing in width, as measured in a radial direction from the geometric axis of the bearing, in a direction of rotation of the shaft. During operation of the bearing, the inclined recess bottoms and gap lands generate additional hydrodynamic forces, increase total stiffness and load capacity, reduce a turbulent component of friction power, and improve thermal stability of the bearing. Further, in operation, the hydrodynamic forces have both a component in the direction opposite to the applied force and a component that is normal to the direction of the applied force.

In further aspects of the invention, a multi-recess hydrostatic journal bearing can include a bearing housing having a plurality of recesses located in the internal surface of the bearing housing, each recess having a corresponding elevated middle portion, each elevated middle portion having a top surface that is inclined to form a variable gap with the outer surface of the shaft, the variable gaps decreasing in width, as measured in a radial direction from the geometric axis of the bearing, in a direction of rotation of the shaft. During operation of the bearing, the inclined surfaces of the elevated middle portions generate additional hydrodynamic forces, increase total stiffness and load capacity, reduce a turbulent component of friction power, and improve thermal stability of the bearing. Further, in operation, the hydrodynamic forces have both a component in the direction opposite to the applied force and a component that is normal to the direction of the applied force.

In further aspects of the invention, a multi-recess porous hydrostatic journal can have a bearing housing, a bushing made of a porous material mounted inside the bearing housing, an annular slot between said bearing housing and said bushing, at least one opening that connects said slots to pump for an external source of pressurized liquid media, a shaft rotating inside the bushing and separated from the bushing's inner surface by a layer of pressurized liquid media, and a plurality of inclined surfaces on an inner surface of the bushing that each contain an inclined portion that forms a gap with an outer surface of the shaft, the gap decreasing in width in a direction of rotation of the shaft as measured in a radial direction from the geometric axis of the bearing. During operation, the gaps generate additional hydrodynamic forces and increase stiffness and load capacity of the bearing.

DETAILED DESCRIPTION OF PREFERRED EMBODIMENTS

The main problems of conventional hydrodynamic bearings in general are an increased friction power; a more sophisticated structure; higher manufacturing expenses; and additional moving parts that increase manufacturing costs and reduce stiffness and accuracy because lack of compliance and non-accuracy of any additional component reduces resultant compliance and resultant rotational accuracy of the spindle.

Accordingly, the disclosed embodiments provide multi-recess hydrostatic journal bearings that effectively combine hydrostatic and hydrodynamic forces, that are simple to manufacture, that have reduced friction power at high speeds, that have better thermal stability, and that do not contain additional moving parts.

In embodiments of the disclosed multi-recess hydrostatic journal bearings, the bottom surface of recesses and/or the surface of gaps that surround the recesses are used to simultaneously create, with high effectiveness, both hydrostatic and hydrodynamic components of an oil reaction force.

Figure 2:
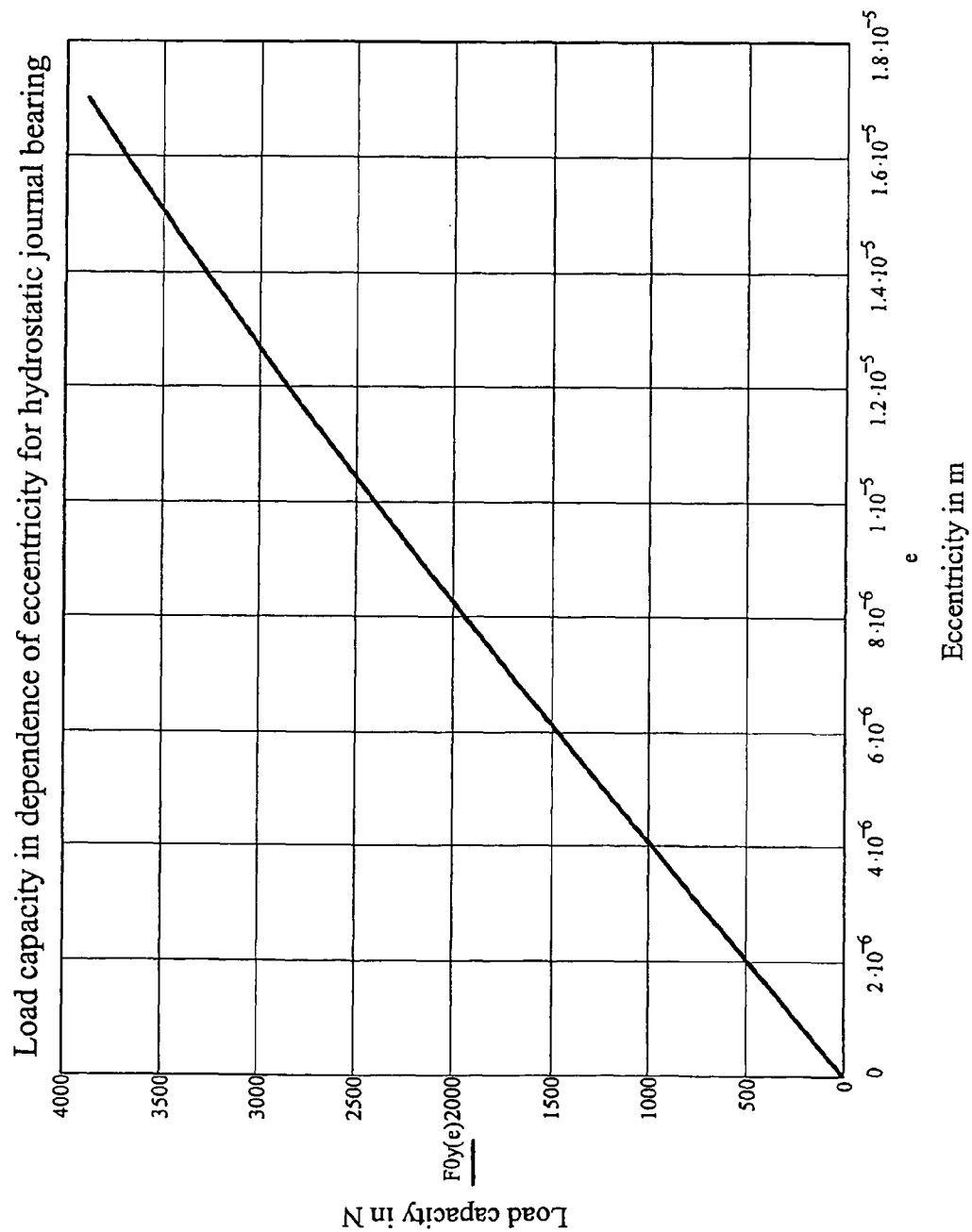
FIG. 2 is a chart of the typical radial load capacity characteristics for multi-recess hydrostatic journal bearings.

One problem that can cause failure of conventional hydrostatic bearings is relatively low resistance to overloading. FIG. 2 shows a typical load capacity chart for hydrostatic journal bearings. In contrast to ball and roller bearings, where stiffness of the bearings increases quickly with increasing external forces, the stiffness of hydrostatic bearings decreases with increases in external forces.

Another problem that can cause failure of conventional hydrostatic bearings is that friction power increases very fast with increases in rotational speed. Friction power increases proportionally to speed by a power of two if oil flow is laminar, and will increase even faster when the oil flow is turbulent. By reducing the oil viscosity, the laminar component of the friction power is decreased, but simultaneously the turbulent component of the friction power will be increased. For high speed applications, the expression D×N, wherein D is the shaft diameter in mm, and N is the speed of rotation of the shaft in RPM, can exceed essentially 1,000,000, at which time, in general, the turbulent component of the friction power becomes dominant.

Figure 1:
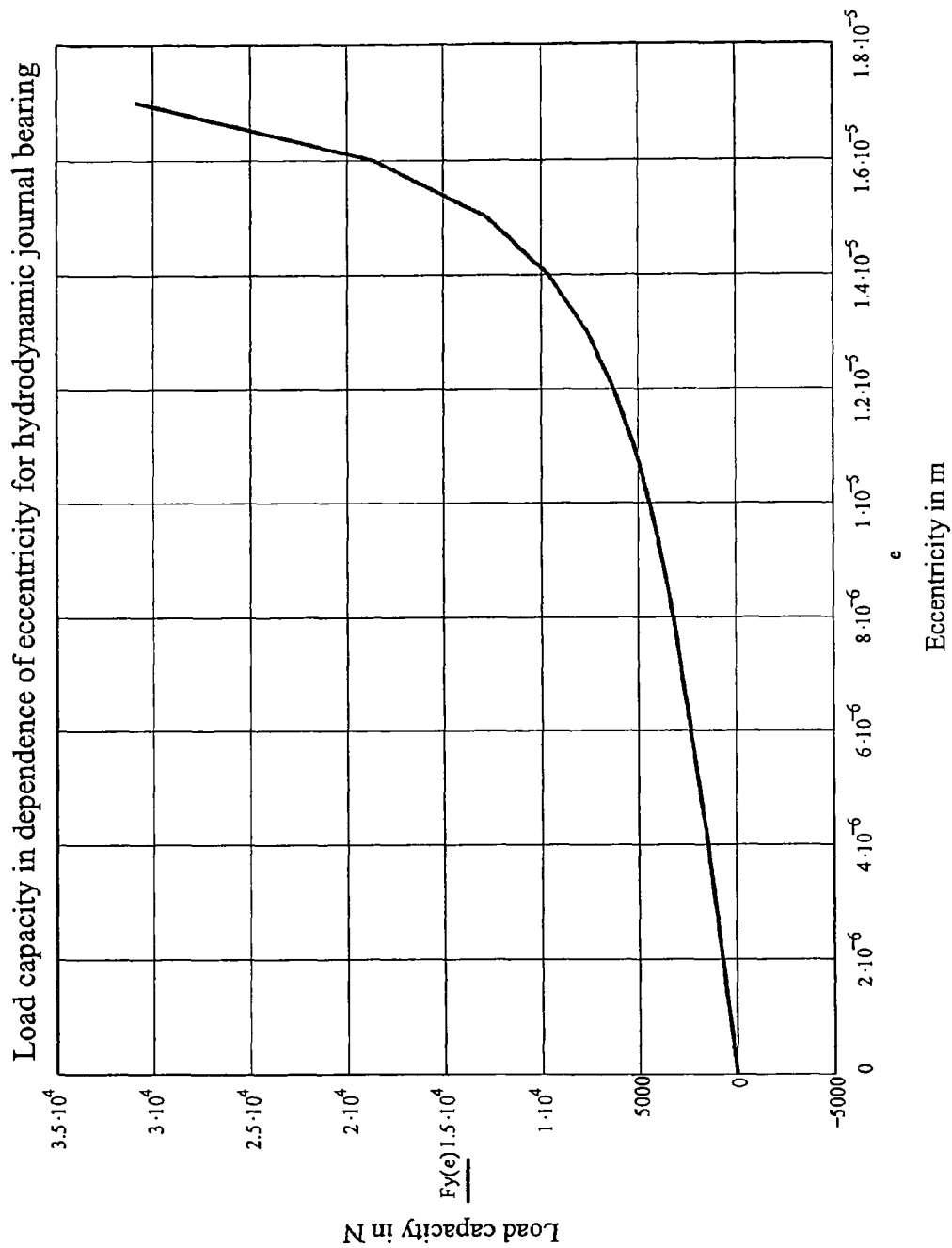
FIG. 1 is a chart of the typical radial load characteristics for hydrodynamic journal bearings.
Figure 3:
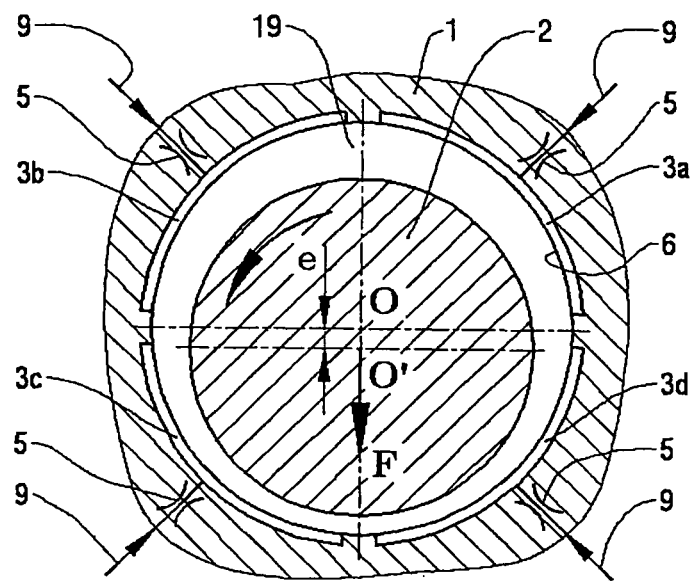
FIG. 3 is a cross-sectional view of a traditional multi-recess hydrostatic journal bearing in a plane perpendicular to the bearing symmetry axis.

One of the most effective ways to improve the performance of hydrostatic bearings is to reduce the problems mentioned above, at least partially, by using hydrodynamic effects more effectively. To some degree, hydrodynamic effects exist in every hydrostatic journal bearing. The hydrodynamic component of the oil pressure is caused when a rotating shaft carries oil into a gap that reduces in width in the direction of the rotation of the shaft. In contrast, the hydrostatic component of the oil pressure is controlled by the external oil supply unit. The hydrodynamic component of the pressure increases as external force increases. As a result, stiffness caused by hydrodynamic pressure increases as eccentricity increases. FIG. 1 shows a typical chart of load capacity of a hydrodynamic bearing. In traditional multi-recess hydrostatic journal bearings as is shown in FIG. 3, hydrodynamic forces occur when the rotational axis O' of the shaft 2 is located eccentrically to the bearing housing 1's geometrical axis O. The eccentricity of the shaft 2 is illustrated by distance e. The hydrodynamic forces occur in both the cylindrical gaps 18, (FIG. 4) that restrict recesses 3a-3b in the axial direction, and in the longitudinal gaps 19, (FIG. 3) that separate one recess from another. But the hydrodynamic component of the oil pressure in both types of gaps will create a resultant force that is directed perpendicular to the external force F in contrast to the hydrostatic resultant force created by the pressures in the recesses 3a-3d that is directed exactly opposite to the external force F.

Figure 4:
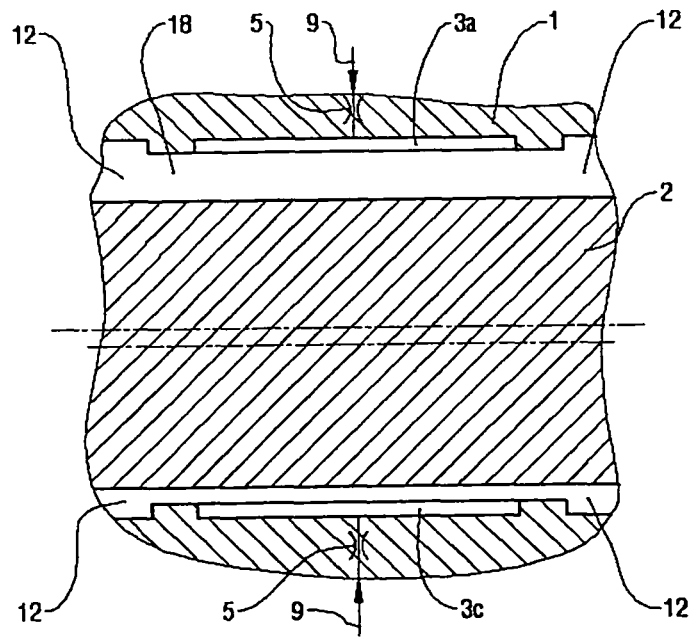
FIG. 4 is a cross-sectional view of a traditional multi-recess hydrostatic journal bearing in a plane parallel to the bearing symmetry axis.

In conventional hydrostatic journal bearings, the hydrodynamic component that is directed opposite to an external force F can only occur under conditions that exist in a cavity, an area where oil pressure is equal to barometric pressure. As shown in FIG. 4, when speed and eccentricity increases, such an area will start to develop in a divergent portion of the cylindrical gaps 18 of the side of return chambers 12, where pressure is equal, or very close, to barometric pressure. As the pressure of oil in a hydrostatic bearing is increased, the cavity area will decrease. One contradiction between the hydrostatic and hydrodynamic components of stiffness is that higher pressure and, hence, higher hydrostatic stiffness, will cause lower hydrodynamic stiffness. At a given rotational speed, if supply pressure is increased, an increased eccentricity is required to maintain the same hydrodynamic stiffness. But as the eccentricity between the rotating shaft and the non-rotating bearing housing increases, the minimal gap decreases. If the filtration rate in line 9 is unable to maintain a minimal gap, the spindle 2 can be seized. Further, even the hydrodynamic force, that is directed perpendicular to external force, usually is very small compared to the hydrostatic force, when the shaft 2 rotates close to the central position, e.g., when the eccentricity is small.

In related art, the combination of hydrodynamic and hydrostatic stiffness components of conventional designs have been modified. The resulting patents can be divided in to two groups. Patents of the first group modify the conventional hydrodynamic bearing to add a hydrostatic force component to eliminate possible bearing wear during the start and stop moments. Patents of the second group modify the conventional hydrostatic bearing to add a hydrodynamic force component to increase the stiffness and the load capacity of the bearing at high rotational speed.

One way to improve the performance of the conventional hydrostatic bearing is to increase the surface of the gaps. Another way to improve the performance of both conventional hydrostatic bearings and conventional hydrodynamic bearings is to separate the bearing's surface into two different parts. One part is responsible for the hydrostatic component of the stiffness and the other part is responsible for the hydrodynamic component of the stiffness. To amplify the hydrodynamic effect when the shaft 2 rotational axis O' is close to the bearing housing 1 axis O, normal conditions for a hydrostatic spindle, an inclined gap that converges in the direction of rotation is used in some embodiments in the patents mentioned above.

Figure 5:
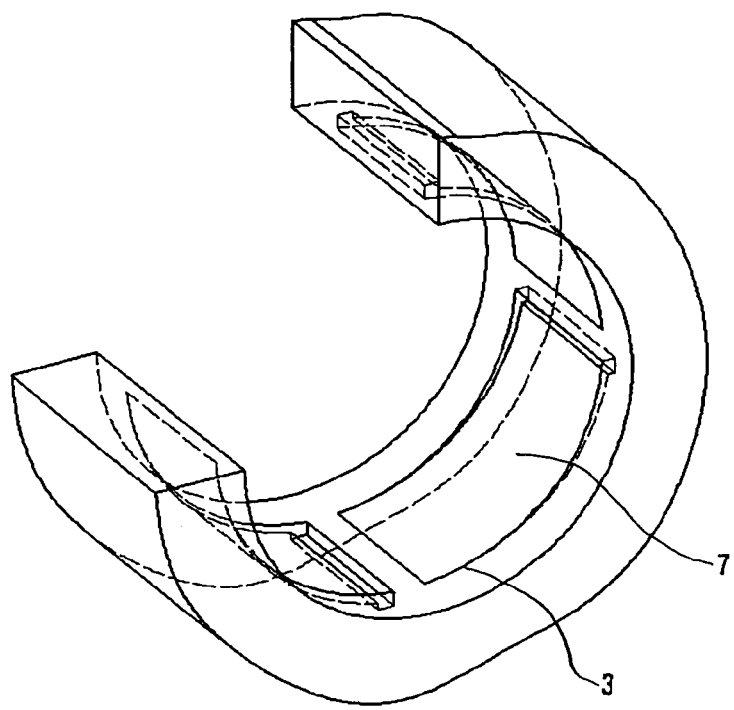
FIG. 5 is an isometric view of a recess of a bearing according to a first embodiment.
Figure 6:
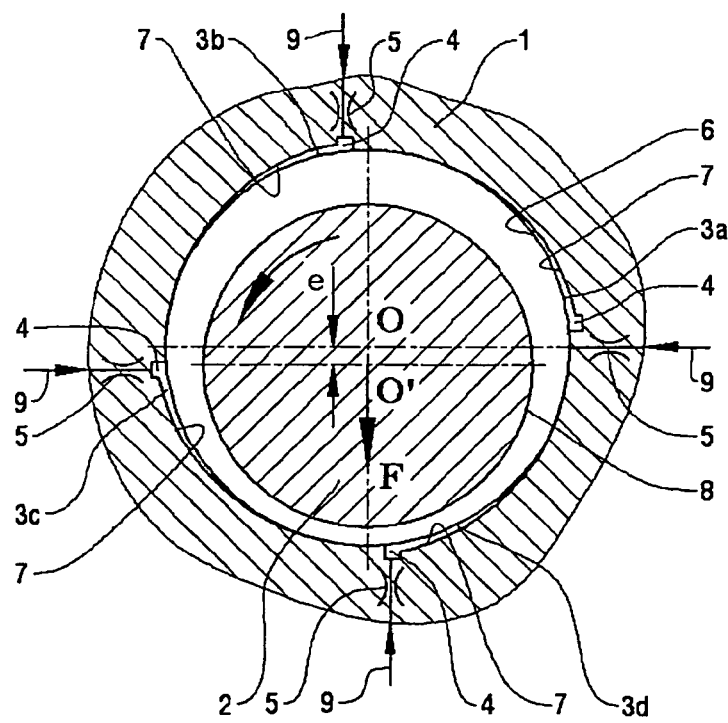
FIG. 6 is a cross-sectional view of a bearing according to the first embodiment in a plane perpendicular to the bearing symmetry axis.

FIGS. 5-6 show a first embodiment of a bearing having a bearing housing 1. FIG. 5 shows an isometric view of a bearing showing a recess 3 and FIG. 6 shows a cross-sectional view of the bearing in a plane perpendicular to both the rotational axis O' of a shaft 2 and the geometrical axis O of the bearing housing 1 opening. When the axis O' of shaft 2 and the geometrical axis O of bearing housing 1 coincide, the shaft 2 is in the central position. In this embodiment, as shown in FIG. 6, shaft 2 rotates in the direction shown by the arrow. Bearing housing 1 has four recesses 3a-3d. The four recesses 3a-3d are shown for descriptive purposes only. The actual number of recesses can be any number equal to or greater than three. Each recess 3a-3d has a surface 7 defining the bottom of the recess 3. The inclined surfaces 7 each creates a variable gap between the surface 7 and the outer surface of the shaft 2. That is, if the shaft 2 is in the central position, the gap areas defined between the surfaces 7 of the recesses 3 and the outer surface of shaft 2 have widths, as measured along the radial direction from the axis O of the bearing housing 1, that decrease in the direction of rotation of the shaft 2. The variable gaps defined by the recesses 3 and the shaft 2 generate hydrodynamic forces.

Every recess is fed by oil from an external hydraulic power unit through the inlet restrictor 5 that is separate for every recess, and which can be, for example, of the capillary type, orifice, small gap, etc. The pressure difference between recesses as a result of eccentricity will provide hydrostatic stiffness that is practically constant the full speed range. The inclined surfaces of the recess bottoms 7 provide hydrodynamic stiffness that increases in response to increases in speed and to increases in eccentricity. Because the surfaces 7 are inclined, the resultant hydrodynamic forces contain two components, one component opposite to external forces and one component normal to external forces, in contrast to a cylindrical gap (without separated inclined surfaces) that can create only a normal component of hydrodynamic force. Both components, one opposite to external forces and one normal to external forces, are significant as compared to hydrostatic forces even when the shaft 2 is rotating close to its central position. This design does not contain any additional moving parts, does not require additional surface area, and is relatively simple to manufacture. Because the recesses 3a-3d are shallow, turbulence of the liquid media in operation will be effectively suppressed and, hence, total friction power will be reduced at high rotational speeds. Additionally, the flow in line 9 through the recesses increases when the rotational speed increases because of increased pressure in the recesses. Thus, thermal stability of the bearing housing 1 is improved and the temperature of the oil in the bearing is less sensitive to rotational speed.

Each recess 3a-3d defines a gap with the shaft 2 that can be measured in the radial direction between the corresponding surface 7 and the outer surface 8 of the shaft 2. However, as shown in FIG. 6, due to the external force F on the shaft 2, the axes O and O' may not be colinear. In this case, the shaft 2 is in an eccentric position, defined by the distance e between the axis O and the axis O'. The sizes of the gaps, the depths of the recesses, and the eccentricity are shown in a strongly exaggerated manner for visualization purposes. The actual sizes of the gaps, the actual depths of the recesses, and the actual eccentricity relative to other dimensions of the bearing housing 1 can be less than shown.

Oil from a pump of an external hydraulic power unit, not shown, is delivered to each recess 3a-3d through the inlet restrictors 5. The inlet restrictors 5 can be any type of restrictor such as, but not limited to, capillary, orifice, slot, etc. The portion 7 of the bottom of each recess 3a-3d is an inclined surface that forms a variable gap between the surface 7 and the external surface 8 of the shaft 2. Each gap reduces in width, e.g., converges, in the direction of the shaft 2 rotation. That is, when the axis O' of the shaft 2 coincides with the axis O of the bearing housing 1, each gap, measured in a radial direction from axis O, decreases in value in the direction of rotation of shaft 7. For each recess, oil moves from a slot 4 to the gap formed between surface 7 and the outer surface 8 of the rotating shaft 2. From the gap area, the oil moves in the axial direction (along axes O and O') to chambers that are connected to the drain line. In a tangential direction the oil moves to adjacent recesses. When shaft 2 is in the central position, axis O' coinciding with axis O, pressure distributions in all recesses are equal because of symmetry, and the resultant force applied to the shaft 2 is zero. But when the shaft 2 is moved by external force F from the central position, the symmetry is destroyed. Further, if shaft 2 does not rotate, or rotates with very low speed, the oil flow inside every recess will be defined by differences in hydrostatic pressure only. The restriction for the oil outlet will be bigger for bottom recesses (3c and 3d) and will be smaller for the upper recesses (3a and 3b). The pressures in the bottom recesses will increase as compared to pressures when shaft 2 is in the central position. In the upper located recesses the pressure will drop as compared to pressures when shaft 2 is in the central position. Pressure differences between recesses will generate a hydrostatic reaction force with a larger component directed opposite to external force F.

As shaft 2 rotates, as shown by the arrow, around the axis O', the oil from receiving slots 4 is compressed into the gaps that are formed by inclined surfaces 7 of recesses 3a-3d and the outer surface 8 of the rotating shaft 2. Oil that has been squeezed into an inclined gap by the rotating shaft 2 due to the oil's viscosity will generate high pressure areas. The pressure distribution in the inclined gaps is defined mainly by eccentricity of the shaft 2, inclination ratio, shaft speed, oil viscosity, and the average size of the gaps. In aspects of the invention, the bottom recesses 3c and 3d have smaller gaps with larger inclinations in contrast to upper recesses 3a and 3b that have smaller inclinations with larger gaps. Hydrodynamic resultant force will be generated in addition to hydrostatic resultant force. Because the average pressure in the inclined gaps increases as speed is increased, the flow through the bearing 1 will increases as well. As a result, both friction power and flow of the liquid media through the bearing will increase simultaneously when rotational speed increases. For this reason, the thermal stability of the bearing of this embodiment is improved as compared with conventional bearings, where flow practically does not depend on the rotational speed. The depth of the slots 4 has to be relatively small to suppress turbulence and at the same time the depth of the slots 4 has to be big enough to provide uniform pressure distribution within the slot area.

Figure 7:
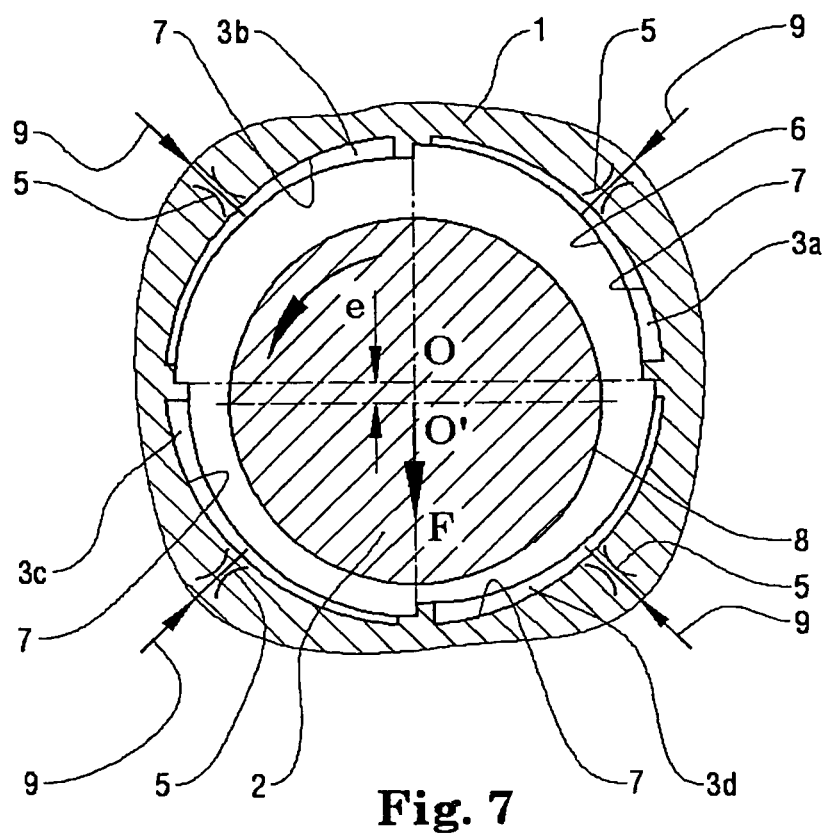
FIG. 7 is a cross-sectional view of a bearing according to a second embodiment in a plane perpendicular to the bearing symmetry axis.

FIG. 7 shows a second embodiment. In this embodiment, the bottom surfaces 7 of the recesses 3a-3d are formed as portions of a cylindrical surface, in contrast to the first embodiment where the surfaces 7 of the recesses 3 are inclined, but the lands that restrict the recesses 3a-3d in the axial direction have inclined surfaces 6 that each form a variable gap that converges in the direction of rotation of the shaft 2. That is, if the shaft 2 is in the central position, the gap areas defined by the surfaces 6 of the lands and the outer surface of the shaft 2 have widths, as measured along the radial direction from the axis O of the bearing housing 1, that decrease in the direction of rotation of the shaft 2. The variable gaps defined by the lands and the shaft 2 generate hydrodynamic forces. Because the bottom surface 7 of each recess 3 is a cylindrical surface, the surfaces 7 are not involved in generation of the hydrodynamic forces. To keep heat generation caused by turbulent effects in the oil to a low level, the recesses 3 have to be shallow.

Hydrodynamic forces generated in the inclined gaps will compose a resultant hydrodynamic force that consists of two components, one component being opposite to external forces and another component being normal to external forces. This is an improvement over cylindrical eccentric gaps in traditional hydrostatic journal bearings that generate only one hydrodynamic force component that is normal to external forces.

Figure 8:
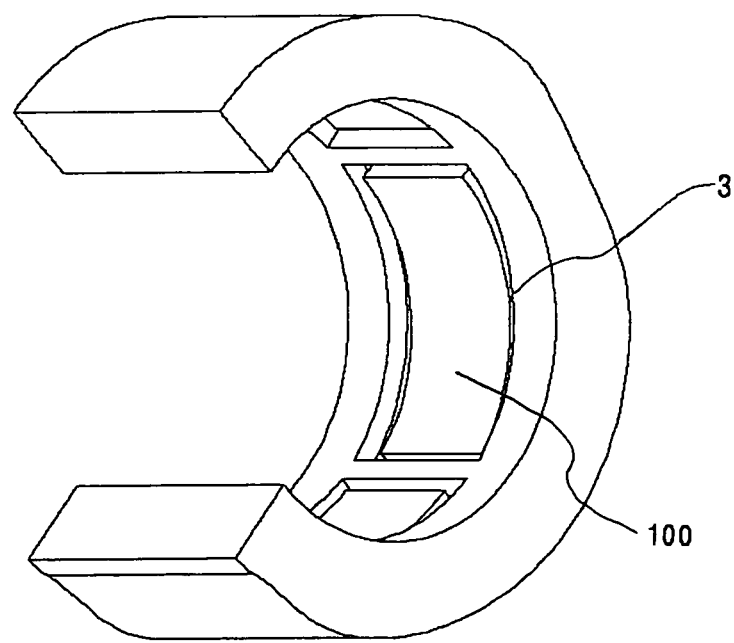
FIG. 8 is an isometric view of a recess of a bearing according to a third embodiment.
Figure 9:
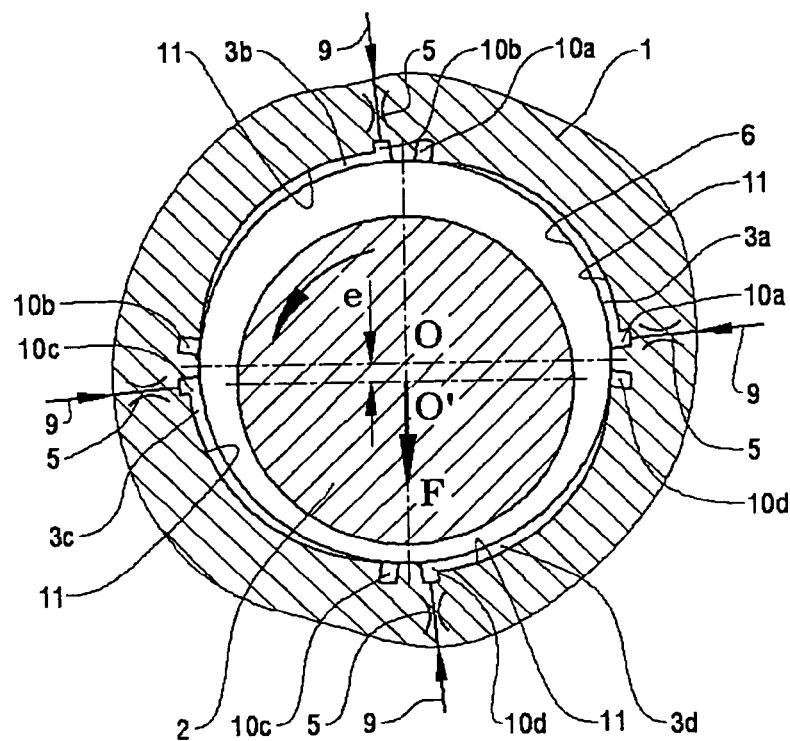
FIG. 9 is a cross-sectional view of a bearing according to the third embodiment in a plane perpendicular to the bearing symmetry axis.

FIGS. 8-9 show a third embodiment. In this embodiment, each recess in the hydrostatic journal bearing contains an island 100 in the middle of the recess 3. Each island 100 is surrounded by a corresponding one of grooves 10a-10d. Each island 100 includes an elevated and inclined surface 11 that forms a variable gap with the outer surface of the shaft 2. That is, if the shaft 2 is in the central position, the gap areas defined between the surfaces 11 of the islands 100 and the outer surface of shaft 2 have widths, as measured along the radial direction from the axis O of the bearing housing 1, that decrease in the direction of rotation of the shaft 2. The variable gaps defined by the islands 100 and the shaft 2 generate hydrodynamic forces. For every recess, oil (represent by the arrow 9) is supplied from an external hydraulic power unit through the inlet restrictors 5 to a groove surrounding the said elevated internal portion of the recess.

From the pump of the external hydraulic power unit, not shown on the drawing, oil in line 9 is supplied through inlet restrictors 5 of each recess 3 to the corresponding ones of grooves 10 that surround the elevated islands 100. As in the first and second embodiments, the hydrodynamic force generated by the rotating shaft 2 in the inclined gaps consists of two components: one component opposite to external force F and one component normal to external force F. These hydrodynamic forces increase a bearing's stiffness and load capacity. Compared to the first embodiment, the present embodiment has higher hydrostatic stiffness but lower hydrodynamic stiffness. The grooves 10a-10d surrounding the elevated island 100 have to be shallow enough to suppress a turbulence component, and not too shallow in order to keep laminar components of the friction at a relatively low level and to provide more or less uniform pressure distribution within the groove area.

FIGS. 10-13 show fourth and fifth embodiments. These embodiments utilize porous media bushings to provide a distributed inlet restrictor instead of the discrete inlet restrictors used in the former embodiments described above.

Figure 10:
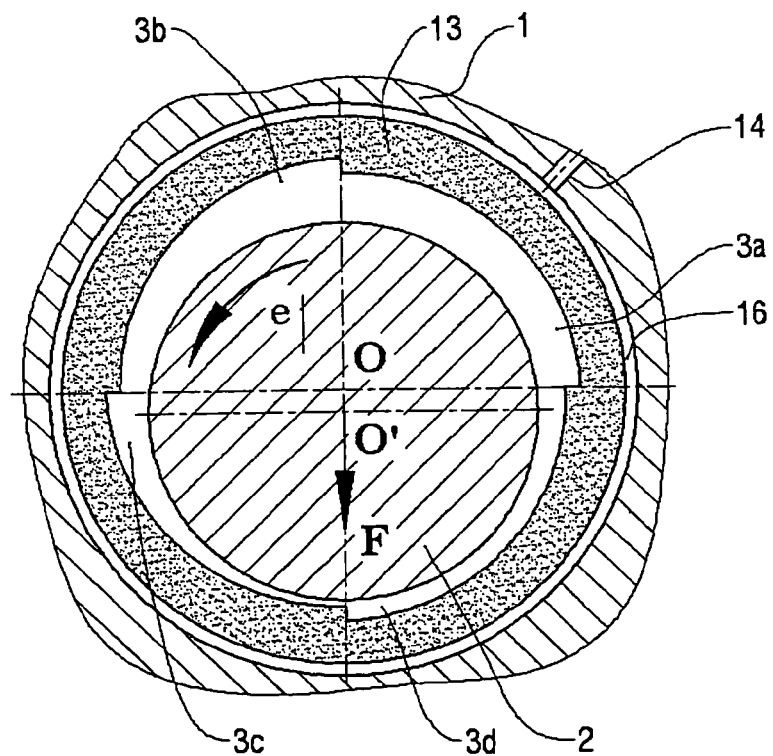
FIG. 10 is a cross-sectional view of a bearing according to a fourth embodiment in a plane perpendicular to the bearing symmetry axis.
Figure 11:
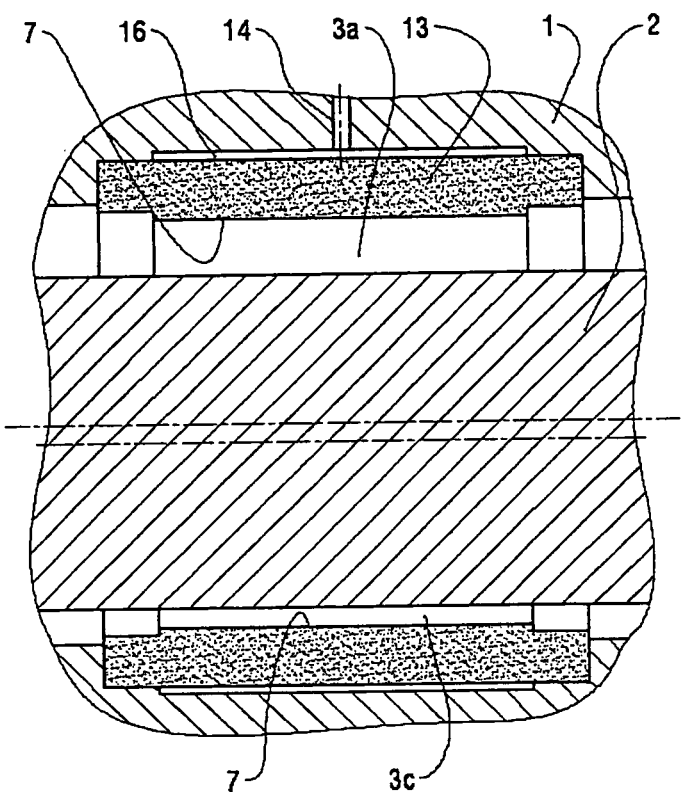
FIG. 11 is a cross-sectional view of a bearing according to the fourth embodiment in a plane parallel to the bearing symmetry axis.

FIGS. 10-11 show the fourth embodiment. In this embodiment, the multi-recess hydrostatic journal bearing has inclined surfaces where, instead of inlet restrictors, porous bearing material is used. In this embodiment, the hydrostatic bearing comprises bearing housing 1, bushing 13 made of a porous material, rotatable shaft 2, and annular slot 16. This embodiment does not require receiving slots or grooves such as grooves 10 in the third embodiment. The annular slot 16 receives high pressure oil from pump of external hydraulic unit, not shown in the figures. Oil is delivered to the annular slot 16 through the relatively large size opening 14 made in the bearing housing 1, and further oil enters through the porous media, the inclined gap between outer surface of the shaft 2, and inner inclined surface 11 of the bearing. Hydraulic restriction of the opening 14 has to be much smaller as compared with the hydraulic restriction caused by the gap between the shaft 2 and the bearing. Hydrostatic stiffness will result from the high pressure oil that is delivered to the eccentric interrupted gap through the porous media. In operation, the hydrodynamic portion of the total stiffness is generated by shaft 2 rotation squeezing oil into the inclined gaps that differ from one to another due to the shaft 2's eccentric position.

Figure 12:
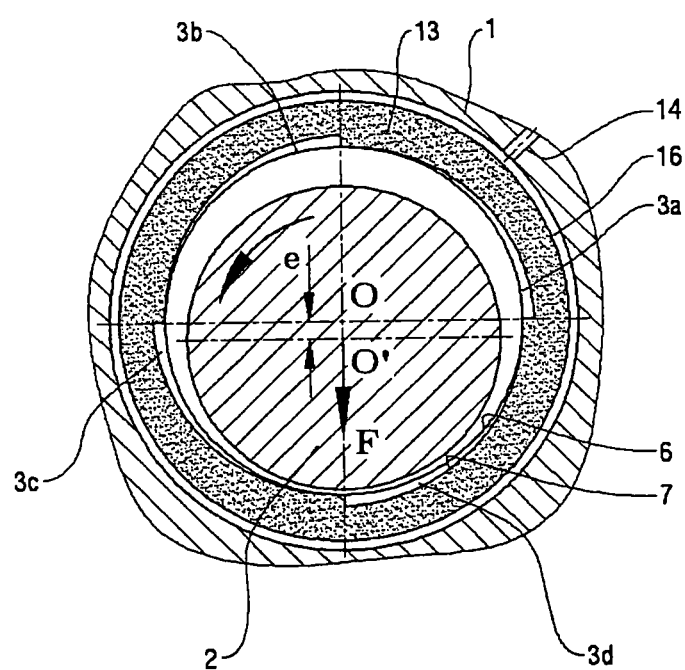
FIG. 12 is a cross-sectional view of a bearing according to a fifth embodiment in a plane perpendicular to the bearing symmetry axis.
Figure 13:
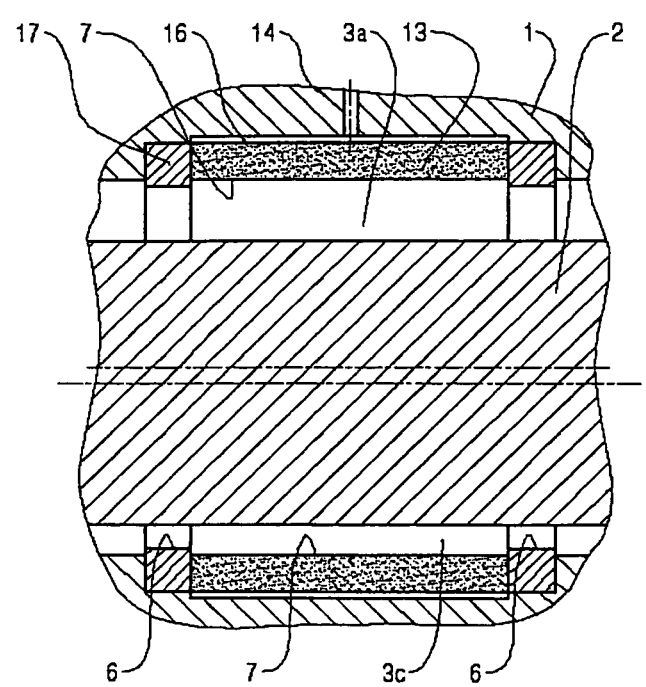
FIG. 13 is a cross-sectional view of a bearing according to the fifth embodiment in a plane parallel to bearing symmetry axis.

FIGS. 12-13 illustrate the fifth embodiment. In this embodiment, in contrast to the fourth embodiment, the recesses 3 are divided in the axial direction by cylindrical lands or rings 17 made of a non-porous material, or a material with an artificially clogged porosity, in order to reduce a flow rate through the porous bearing. This results in an increase in the hydrodynamic component of the total stiffness. As in the first embodiment, the bottom surfaces 7 of the recesses 3 each define a variable gap with the outer surface of the shaft 2. That is, if the shaft 2 is in the central position, the gaps defined by the surfaces 7 of the recesses 3 and the outer surface of the shaft 2 have widths, as measured along the radial direction from the axis O of the bearing 1, that decrease in the direction of rotation of the shaft 2. In contrast, cylindrical gaps are formed between the internal surfaces 6 of rings 17 and the outer surface of the shaft 2. Rings 17 are preferably made of non-porous material and, hence, they reduce the oil flow through recesses 3.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A multi-recess hydrostatic journal bearing comprising:
a rotatable shaft having an outer surface;
a bearing housing that surrounds the rotatable shaft, the bearing housing having an inner surface facing the outer surface of the rotatable shaft;
a plurality of recesses located in the internal surface of the bearing housing, each recess of the plurality of recesses having a corresponding recess bottom;
pressurized liquid media between the inner surface of the bearing housing and the outer surface of the rotatable shaft;
inlet restrictors for the plurality of recesses, the inlet restrictors being connected through openings in the bearing housing to an external source of the pressurized liquid media; and
gap lands surrounding each of the plurality of recesses, the gap lands separating the plurality of recesses from chambers connected to atmosphere pressure and separating the plurality of recesses from one another, said recess bottoms being inclined to form variable gaps with the outer surface of the rotatable shaft, the variable gaps decreasing in width, as measured in a radial direction from a rotational axis of the bearing, in a direction of rotation of the rotatable shaft,
wherein, during operation of the bearing, the inclined recess bottoms generate hydrodynamic forces, and
the hydrodynamic forces have both a component in a direction opposite to an applied force and a component in a direction perpendicular to the applied force, and
wherein both the recess bottoms and the gap lands surrounding every recess of the plurality of recesses are inclined to form variable gaps with the outer surface of the rotatable shaft, the variable naps decreasing in width, as measured in the radial direction from the rotational axis of the bearing, in the direction of rotation of the rotatable shaft.

2. The multi-recess hydrostatic journal bearing according to claim 1, wherein the gap lands surrounding every recess of the plurality of recesses are inclined.

3. The multi-recess hydrostatic journal bearing according to claim 1, wherein the gap lands surrounding every recess of the plurality of recesses each define portions of a cylindrical surface.

4. The multi-recess hydrostatic journal bearing according to claim 1, wherein the bottom surfaces of the plurality of recesses each contain a slot portion to accept pressurized liquid media from the corresponding inlet restrictor.

5. The multi-recess hydrostatic journal bearing according to claim 1,
wherein the plurality of recesses each have an elevated middle portion provided inside each recess and a groove that surrounds the elevated middle portion to accept pressurized liquid media from the corresponding inlet restrictor, each elevated middle portion having an inclined surface that forms a variable gap with the outer surface of the rotatable shaft, the variable gap decreasing in width in the direction of rotation of the rotatable shaft as measured in the radial direction from the rotational axis of the bearing,
the gap lands each define portions of cylindrical surface, and
the elevated middle portions and the gap lands, during operation of the bearing, generate second hydrodynamic forces.

6. A multi-recess hydrostatic journal bearing comprising:
a rotatable shaft having an outer surface;
a bearing housing that surrounds the rotatable shaft, the bearing housing having an inner surface facing the outer surface of the rotatable shaft;
a plurality of recesses located in the internal surface of the bearing housing, each recess of the plurality of recesses having a corresponding elevated middle portion provided inside each recess, each elevated middle portion having a top surface that is inclined to form a variable gap with the outer surface of the rotatable shaft, the variable gaps decreasing in width, as measured in a radial direction from a rotational axis of the bearing, in a direction of rotation of the rotatable shaft;

pressurized liquid media between the inner surface of the bearing housing and the outer surface of the rotatable shaft;

inlet restrictors for the plurality of recesses, the inlet restrictors being connected through openings in the bearing housing to an external source of the pressurized liquid media; and gap lands surrounding each of the plurality of recesses, the gap lands separating the plurality of recesses from chambers connected to atmosphere pressure and separating the plurality of recesses from one another, wherein, during operation of the bearing, the inclined surfaces generate hydrodynamic forces, the hydrodynamic forces have both a component in a direction opposite to an applied load and a component in a direction perpendicular to the applied load, and a groove surrounds each elevated middle portion to accept pressurized liquid media from a corresponding inlet restrictor of the plurality of recesses.

* * * * *